(No Model.)  8 Sheets—Sheet 1.

J. O. STORVIK.
STAVE MAKING MACHINE.

No. 539,097. Patented May 14, 1895.

Witnesses:
Inventor
John Olson Storvik (No Model.) 8 Sheets—Sheet 2.
J. O. STORVIK.
STAVE MAKING MACHINE.

No. 539,097. Patented May 14, 1895.

Witnesses:

Inventor:
John Olson Storvik.
By
atty.

(No Model.) 8 Sheets—Sheet 3.
J. O. STORVIK.
STAVE MAKING MACHINE.
No. 539,097. Patented May 14, 1895.
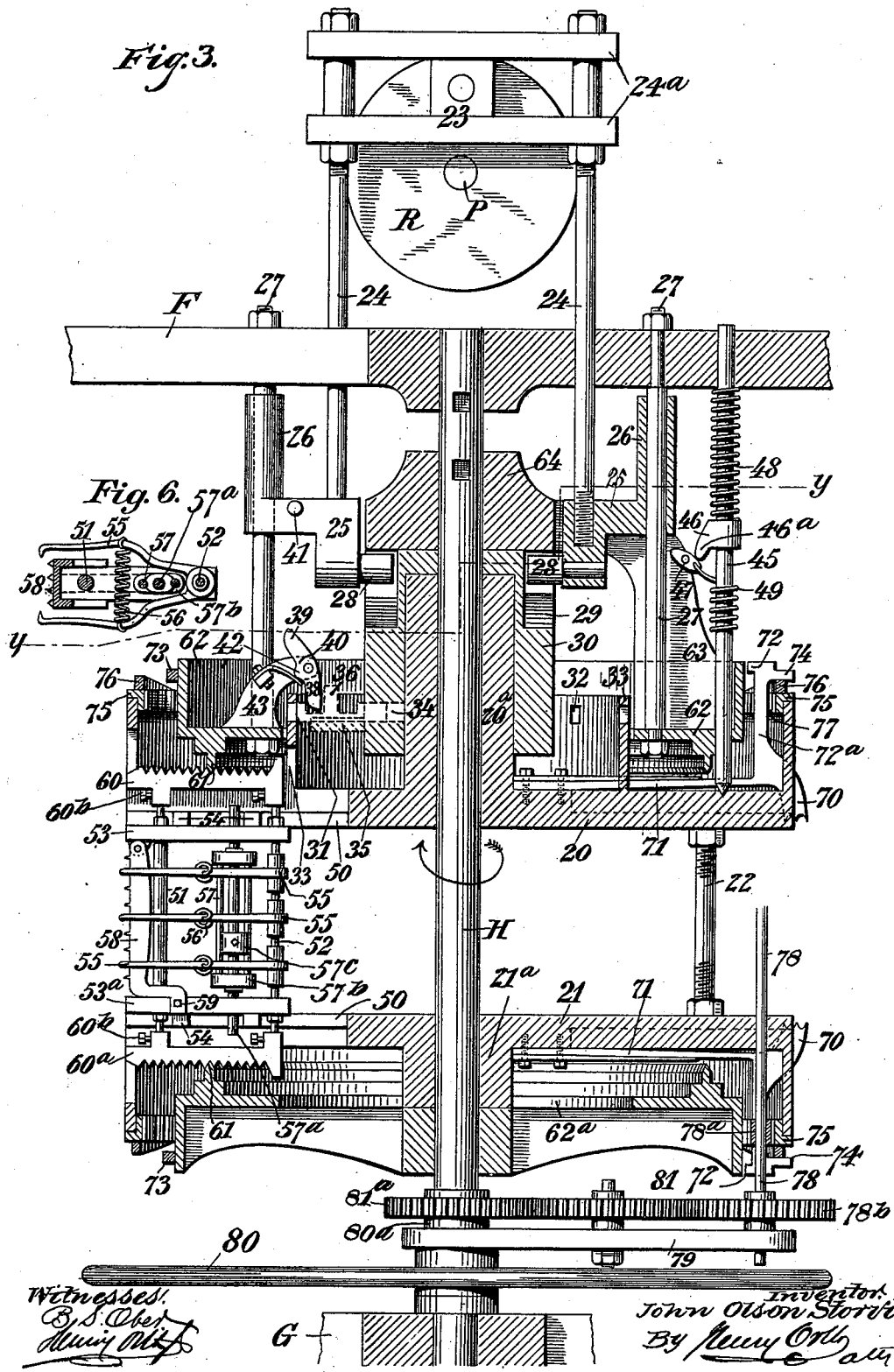

(No Model.) 8 Sheets—Sheet 4.

J. O. STORVIK.
STAVE MAKING MACHINE.

No. 539,097. Patented May 14, 1895.

Witnesses,
B. S. Obed
Henry Otts

Inventor:
John Olson Storvik
By Henry Otts
Atty (No Model.) 8 Sheets—Sheet 5.
J. O. STORVIK.
STAVE MAKING MACHINE.

No. 539,097. Patented May 14, 1895.

(No Model.) 8 Sheets—Sheet 6.

J. O. STORVIK.
STAVE MAKING MACHINE.

No. 539,097. Patented May 14, 1895.

Witnesses:

Inventor
John Olson Storvik.
By his Attorney (No Model.) 8 Sheets—Sheet 7.

J. O. STORVIK.
STAVE MAKING MACHINE.

No. 539,097. Patented May 14, 1895.

Witnesses
B. S. Ober
Henry Ortz

Inventor:
John Olson Storvik
By Henry Ortz
Atty (No Model.)  8 Sheets—Sheet 8.

J. O. STORVIK.
STAVE MAKING MACHINE.

No. 539,097.  Patented May 14, 1895.

Witnesses:
B. S. Ober.

Inventor:
John Olson Storvik
By ____ Atty

UNITED STATES PATENT OFFICE.

JOHN OLSEN STORVIK, OF CHRISTIANSUND, NORWAY.

STAVE-MAKING MACHINE.

SPECIFICATION forming part of Letters Patent No. 539,097, dated May 14, 1895.

Application filed January 31, 1895. Serial No. 536,828. (No model.) Patented in Norway February 5, 1894, No. 3,687.

*To all whom it may concern:*

Be it known that I, JOHN OLSEN STORVIK, a subject of the King of Sweden and Norway, residing at Christiansund, in the Kingdom of Norway, have invented certain new and useful Improvements in Stave-Making Machines, (for which Letters Patent have been obtained in Norway, No. 3,687, dated February 5, 1894;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has relation to machines for making barrel staves, and it has for its object the provision of means whereby complete barrel staves ready for jointing and coopering may be automatically made, as will now be fully described, reference being had to the accompanying drawings, in which—

Figure 1:
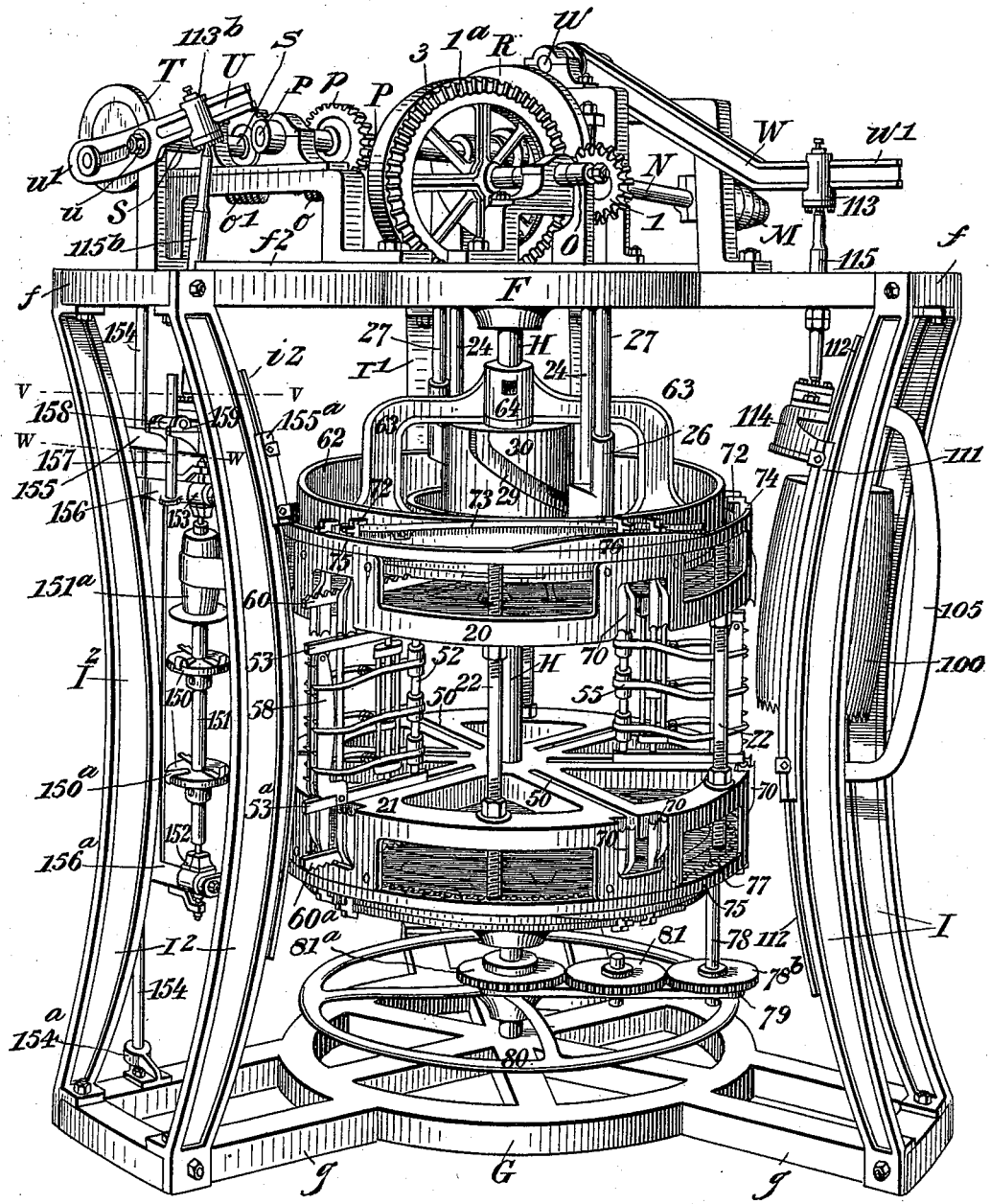
Figure 2:
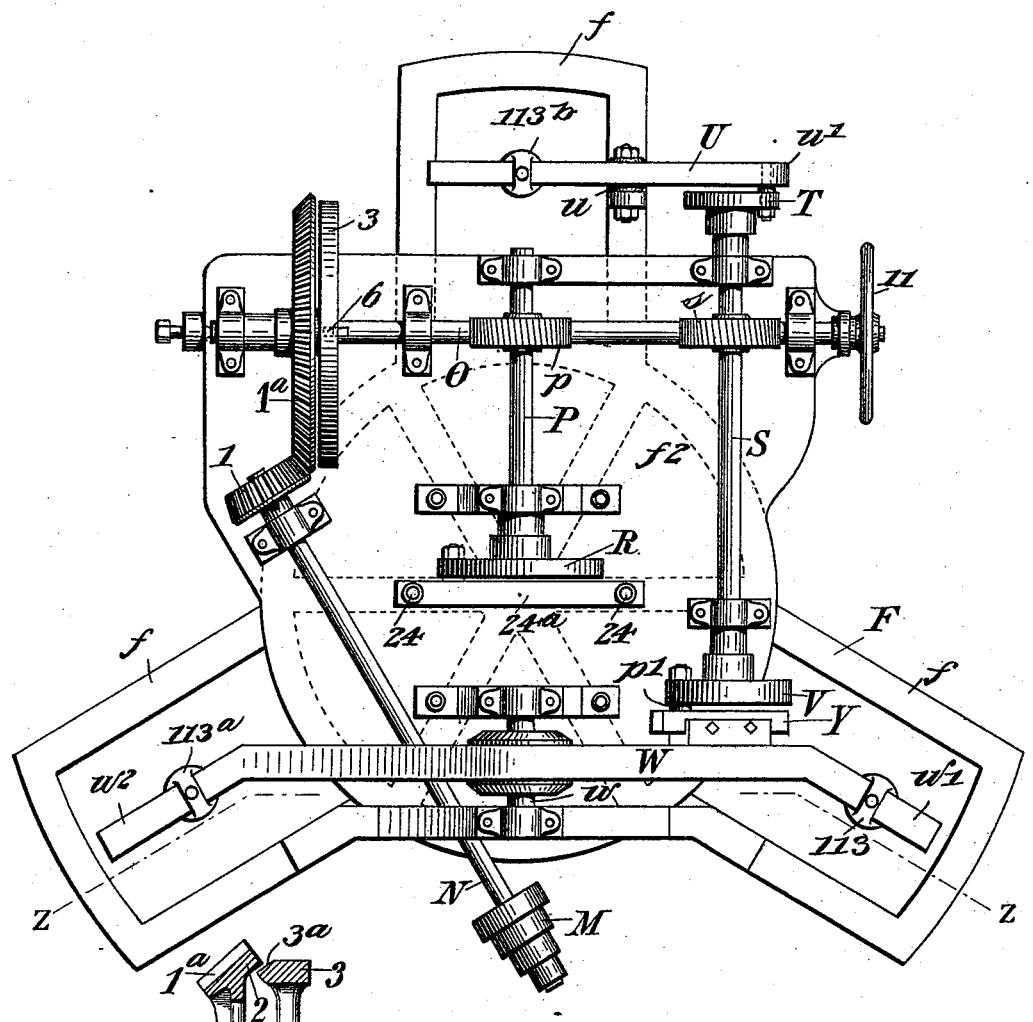
Figure 2A:
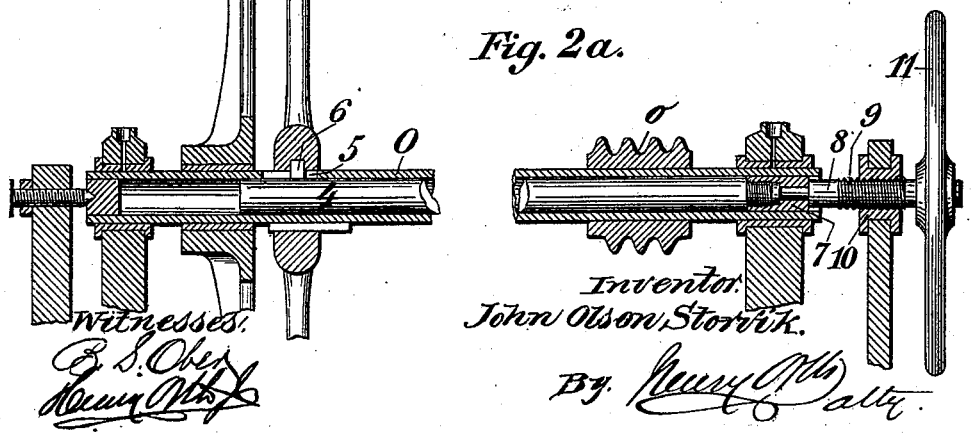
Figure 4:
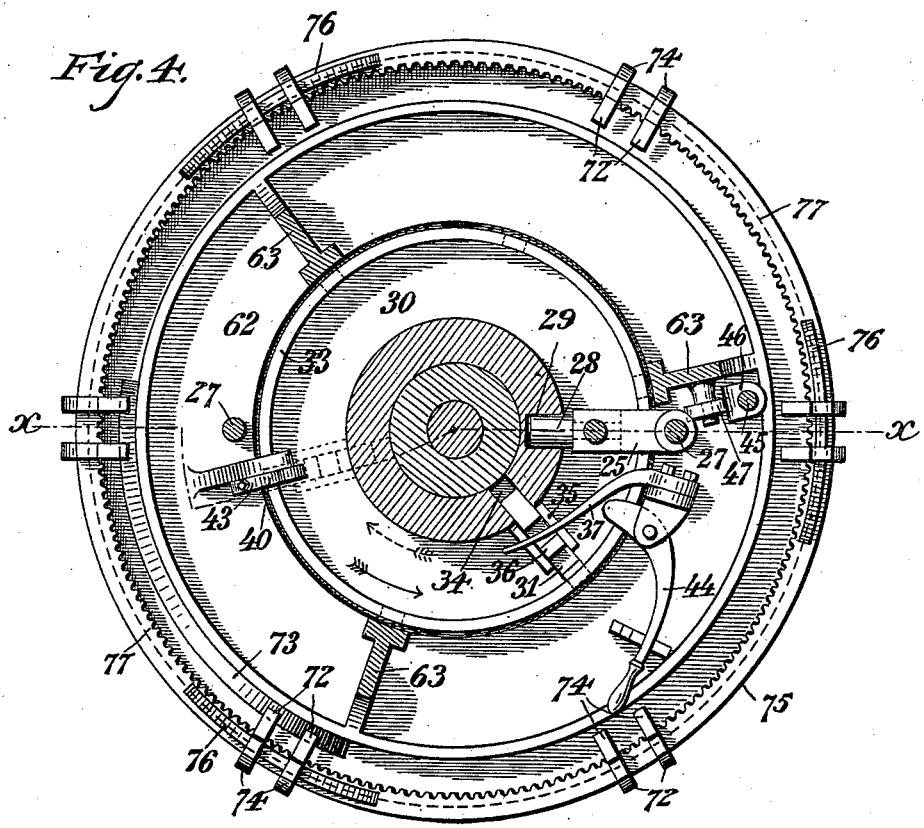
Figure 5:
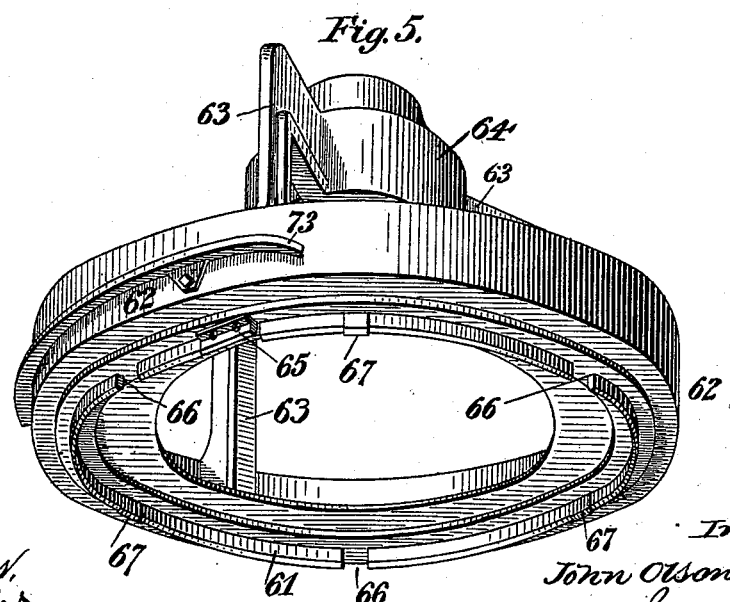
Figure 7:
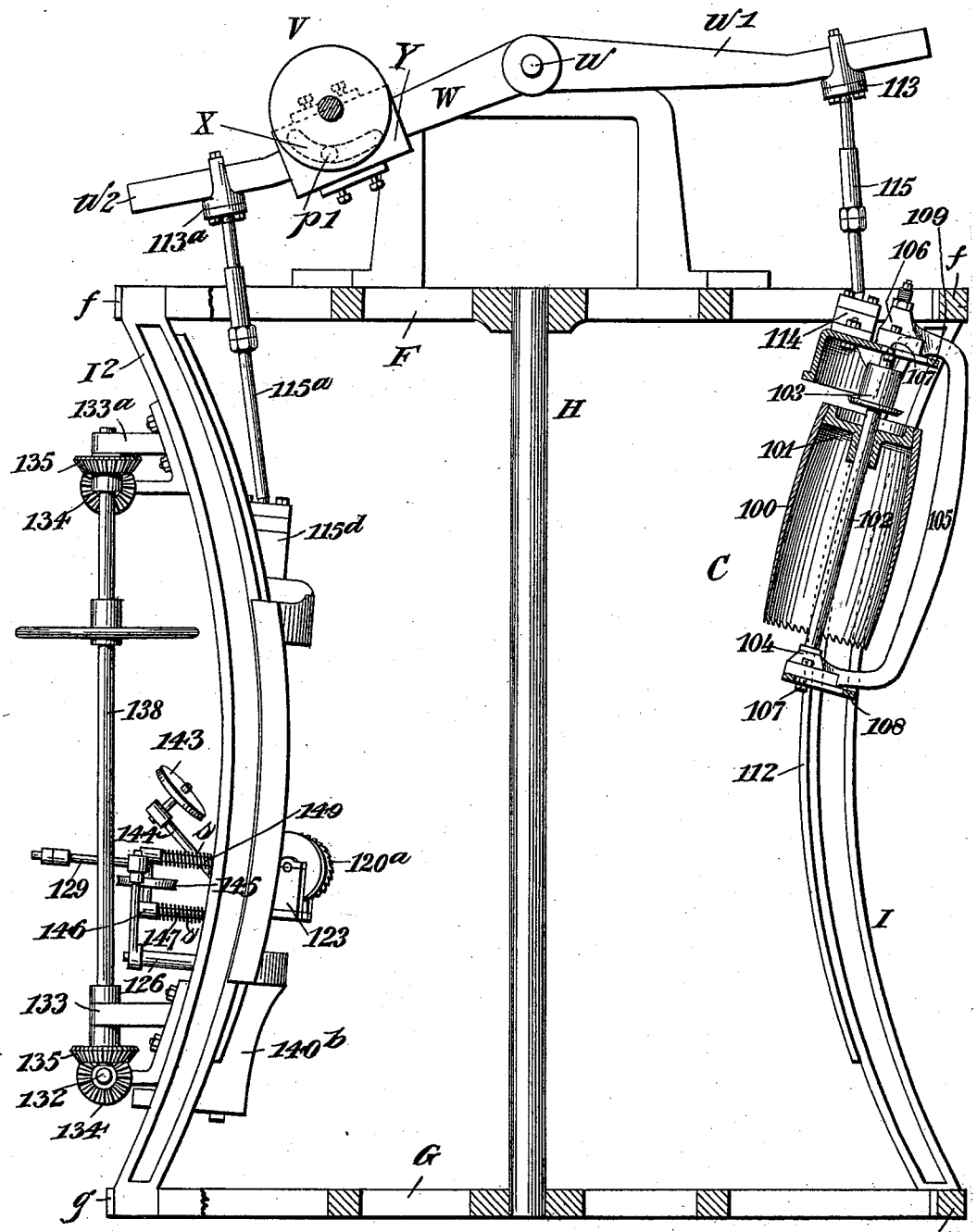
Figure 8:
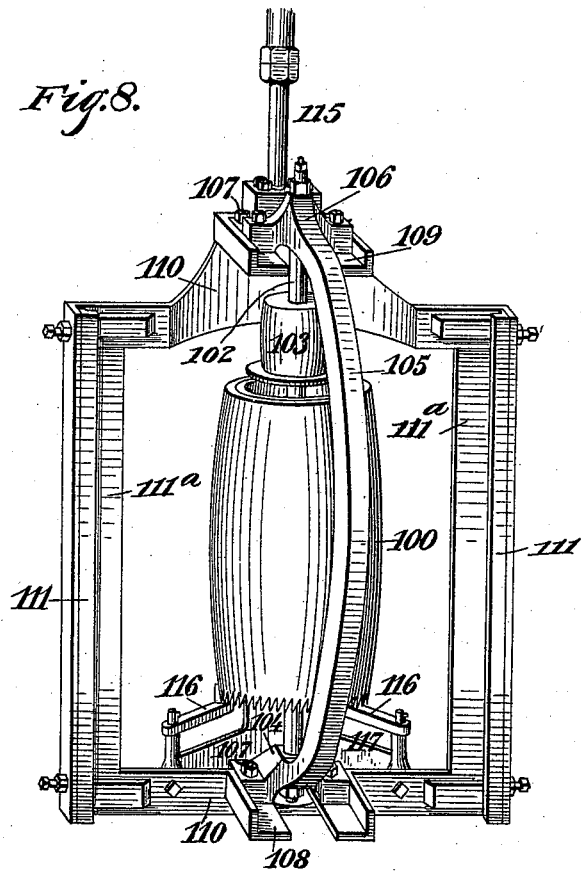
Figure 9:
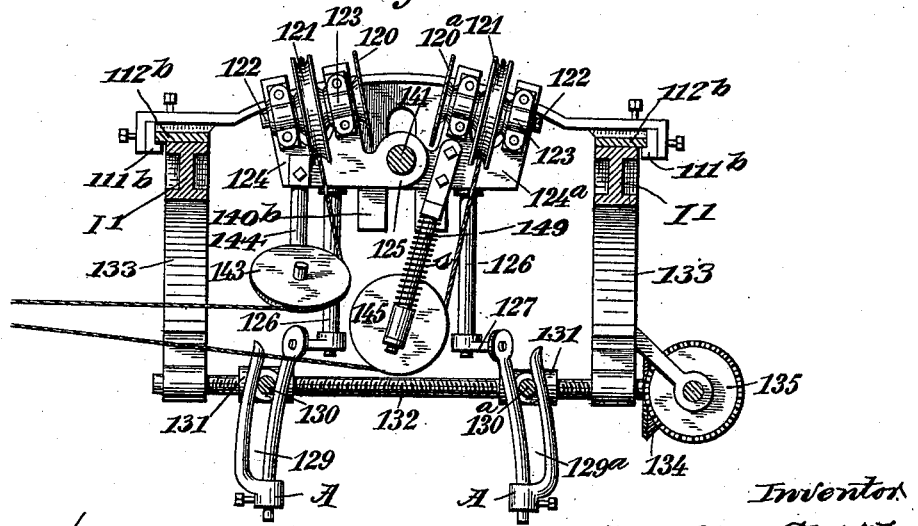
Figure 10:
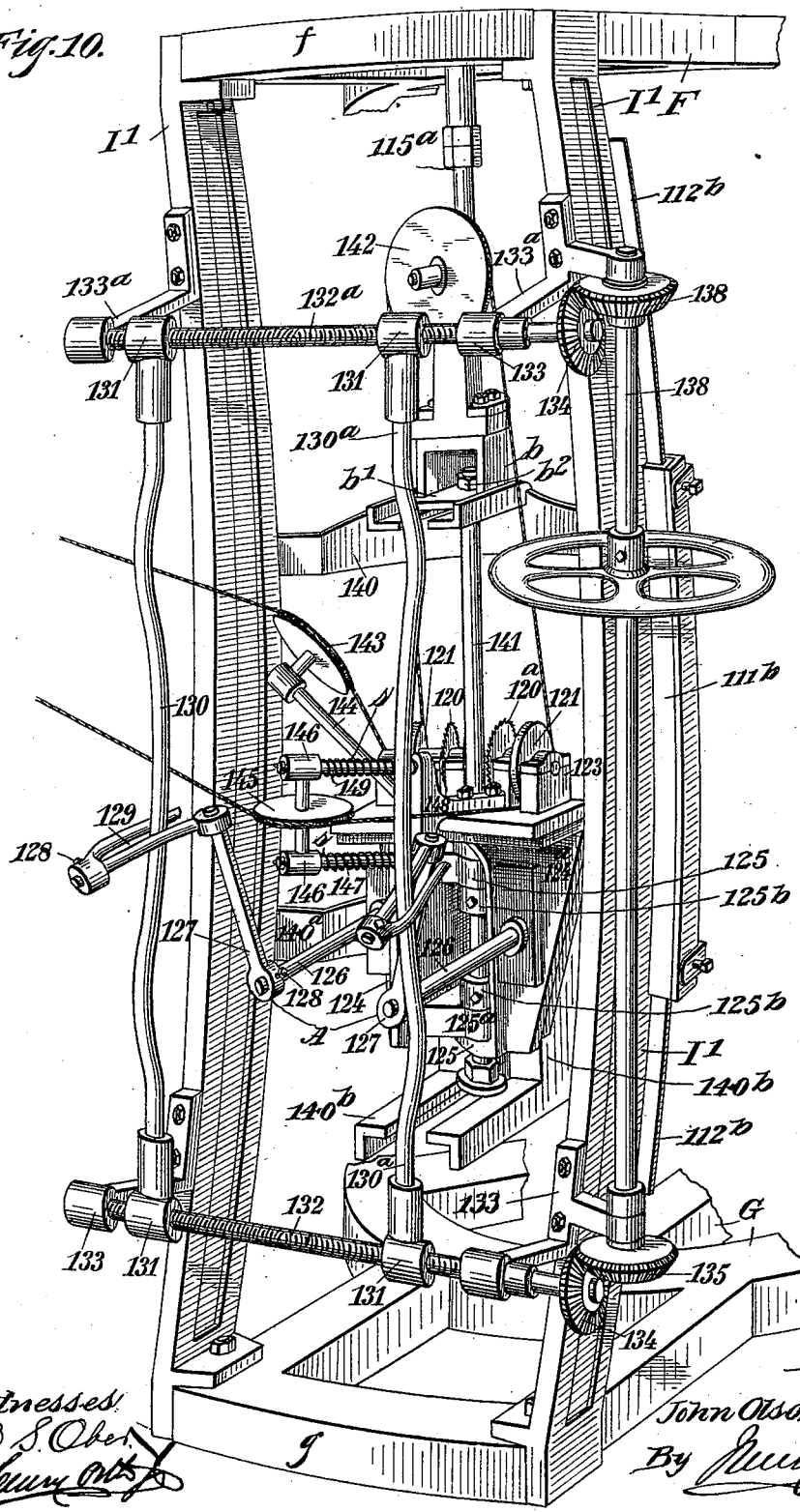
Figure 11:
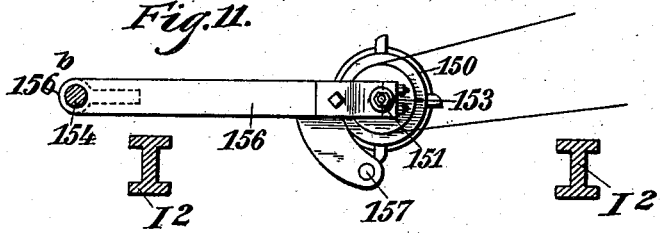
Figure 12:
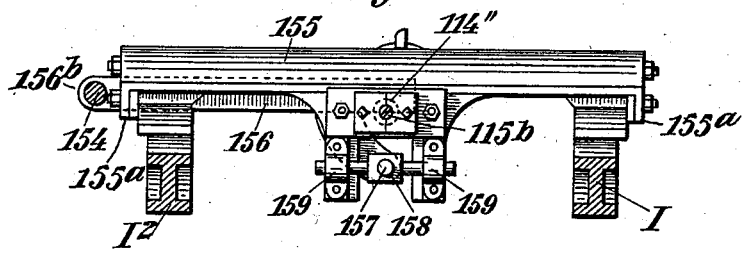
Figure 13:
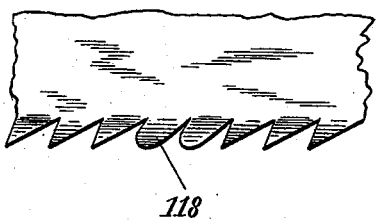

Figure 1 is a perspective view of a machine embodying my invention. Fig. 2 is a top plan view of the machine-frame head and parts mounted thereon. Fig. 2$^a$ is a sectional detail view of one of its counter-shafts. Fig. 3 is a vertical sectional view taken on or about on line $x$ $x$ of Fig. 4, which last-named figure is a cross-sectional view taken on or about on line $y$ $y$ of the said Fig. 3. Fig. 5 is a detail perspective view of the upper head of the carrier or frame for the work-supports. Fig. 6 is a cross-sectional view of one of the work-supports. Fig. 7 is a vertical sectional view on or about on line $z$ $z$ of Fig. 2. Fig. 8 is a perspective view of the stave-cutting saw and its supporting-frame. Fig. 9 is a cross-sectional view of the jointing-saw carrier or carriage and some of the mechanism connected therewith. Fig. 10 is a perspective view of the jointing mechanism and part of the main frame. Figs. 11 and 12 are detail sectional views of the crozing, chamfering, and gaging devices; and Fig. 13 is a detail view of a portion of the cutting-edge of the stave cutting and jointing saws.

Similar symbols indicate like parts wherever such may occur in the figures of drawings above described.

The machine consists of a main frame, working tools comprising a stave cutter or saw, crozing, chamfering and gaging mechanisms, stave-jointing devices, a work support, and suitable driving mechanism, and these component elements I will describe in detail in the order named.

The main frame consists of a foot or base plate G and a head plate F, which for the purpose of lessening their weight without impairing the stability of the machine are constructed of an open-work circular central plate or wheel having open or slotted radial arms, indicated at $g$ $g$ and $ff$ respectively, a top plate $f^2$ Fig. 2, being secured to the head plate F, which top plate carries the bearings for the driving shafts. The head and foot plates are connected by six vertical braces arranged in pairs, I, I', I², respectively, said braces also serving as guides for the carriages of the various working tools, and are arranged equidistant from one another.

I may state here that the vertical braces I, I', I² are of a curvature corresponding with that of the barrel saw, and consequently with that of the stave cut thereby, but if a straight stave is to be cut by a cylindrical saw, then said braces will be perfectly straight, as will be readily understood. The two heads G, F, are further braced by a central rod or shaft H that serves as a pivot for and about which the work holder framing or carriage revolves.

*The stave cutter.*—Referring to Figs. 1, 2, 7, 8 and 13, the stave cutter consists of a saw 100 that is barrel-shaped and is adapted to cut a stave of corresponding curvature from a block of wood, and in order that a stave having both faces smooth may be obtained, I give some of the saw teeth, 118, Fig. 13, the form of a plane bit, and in practice I preferably arrange said teeth in pairs at suitable intervals in the cutting or toothed edge of the saw, though this is not absolutely necessary, as single planer teeth may be interposed from distance to distance, or a greater number of planer teeth than two may be grouped together.

The saw 100 has a head in which is formed a hub 101 secured to a spindle 102 that carries a belt pulley 103, Fig. 7, belted to any suitable prime motor or to a transmission pulley, and said spindle has its bearings in the forked ends 104 and 106 of a yoke or bow 105, said forked ends of the yoke fitting boxes 108 and 109 respectively secured to or formed on the cross bars of the saw carriage, said boxes being slotted for the passage of bolts 107, by means of which the yoke is adjustably secured to its carriage so that staves of varying thickness can be cut, the adjustment being toward or from the center support or shaft H of the machine about which the work holders revolve.

The vertical or side bars 111$^a$ of the carriage are of a curvature corresponding with that of the inner faces of the vertical braces I, to which faces rails 112 are bolted that constitute the track for the saw carriage, and to said side bars 111$^a$ of the saw carriage are detachably secured by means of bolts retaining angle bars 111, Fig. 8, that hold the carriage to its track, said retaining bars overlapping the rails 112, as more clearly shown in Fig. 9 at 111$^b$ and 112$^b$, which illustrates the corresponding parts of the carriage for the jointing tools. The saw is steadied at the cutting edge by means of arms 116, Fig. 8, projecting from the lower cross bar 110 of the saw carriage, from which also projects an arm 117 that extends into the saw close to its inner periphery and is so positioned relatively to the block of wood operated upon as to form an abutment for that edge of the stave sawed off that faces the direction of rotation of the saw, so that a stave when severed from a block of wood is not liable to be carried along by and with said saw, but is caused to drop out of it, thereby guarding against injury to the stave or saw or both.

The upper bearing box 109 is provided with a bearing in which is articulated, as by a ball and socket, or other universal joint, one end of a two part hanger rod 115, the sections of the rod being adjustably jointed so that the length of said rod can be varied in accordance with the length of stave to be cut. The opposite end of said rod 115 is articulated to a bearing 113 adjustably secured to an arm $w'$ of a two-armed or balance lever W, fulcrumed at $w$, to a bracket rising from the head F of the main frame. From the opposite end of lever W is suspended the carriage for the jointing tools hereinafter to be described, and said lever is rocked or oscillated through the medium of a slide block, Y, provided with an irregular groove X into which projects the wrist pin $p'$ on a disk V secured to a shaft S that carries a worm wheel $s$ in gear with a worm $o$ on a transmitting shaft O, Figs. 1, 2 and 2$^a$, said shaft O carrying a loose gear 1$^a$ meshing with a pinion 1 on the main shaft N that carries the usual belt pulley M. The gear 1$^a$ is locked to shaft O through the medium of a friction disk 3 keyed by means of a key 6 to a spindle 4 contained in said shaft O, said spindle having sufficient endwise motion in the shaft to admit of moving the disk 3, so as to bring its chamfered or beveled friction surface 3$^a$ into or out of engagement with a corresponding surface 2 on gear 1$^a$. Endwise movement is imparted to spindle 4 through the medium of a screw-threaded spindle 9 working in a correspondingly threaded bearing 10, said threaded spindle carrying a hand wheel and being coupled to spindle 4 by means of a sleeve 7 in such manner that said threaded spindle 9 is enabled to revolve without revolving spindle 4, as plainly shown in Fig. 2$^a$. By means of this arrangement the driving mechanism may be started and stopped at will, as all of the tool carriers receive their motion from the shaft O through main shaft N, as will hereinafter appear.

*The crozing, chamfering, and gaging tools.*—Referring to Figs. 1, 11 and 12, the carriage for these devices consists of a cross bar or head 155, the ends 155$^a$ of which are bent at right angles and overlap guide rails $i^2$ secured to the inner curved faces of the vertical braces I$^2$ of the main frame, angle braces adapted to engage the outer edges of the rails $i^2$ being detachably secured by means of set screws to the bent ends 155$^a$ so as to hold the cross head 155 to its guide track, the construction being similar to that of corresponding parts of the carriage for the stave cutter 100 above described, and of the jointing saws hereinafter to be described and more plainly shown in Fig. 9, wherein the angle bars are indicated at 111$^b$. The cross head 155 has a bearing 114″ to which is jointed by ball and socket joint one end of an extensible rod 115$^b$ whose opposite end is similarly jointed to a bearing 113$^b$ adjustable on one arm of a two-armed lever U fulcrumed at $u$, the other arm $u'$ of which is slotted longitudinally for the reception of the wrist pin on a crank disk T on shaft S, heretofore referred to, by means of which said lever is rocked or oscillated, thereby imparting a reciprocating motion to the cross head 155. The crozing, chamfering and gaging tools consist of two cutter disks 150 and 150$^a$ to which are secured the usual crozing, and chamfering cutters as well as the cutters that trim the upper and lower edges of the stave, or more properly the block, so that all of the staves turned out will be of the same length. The disks 150 and 150$^a$ are keyed to a shaft 151 that has its bearings in horizontal arms 156, 156$^a$ of a frame that is pivoted to a vertical rod 154 which passes loosely through suitable openings in ears 156$^b$ projecting from the horizontal arms 156 and 156$^a$, said rod being suitably secured to or connected with two of the main frame radial arms $g, f'$, as shown at 154$^a$ Fig. 1. The upper horizontal arm 156 is connected with the cross head 155 by means of a rod 157 that extends loosely through a block 158 journaled at 159 in a suitable bracket projecting from the cross-head 155, thereby enabling the tool frame and shaft carrying the tools to swing on rod 154 toward and from the work holder, the said shaft carrying a suitable belt pulley 151$^a$ driven by belt from any suitable motor or transmission pulley.

It is obvious that as the crank disk T is revolved the crank pin will move along the slot in arm $u'$ of lever U and impart a rocking motion to said lever and therethrough a vertical reciprocating motion to the cross head 155, and as the latter is connected with the tool frame by rod 157 which is free to slide in its journaled bearing block 158, the movements of the cross head will cause the tool frame to oscillate on its pivot bar 154 and swing the same inwardly or toward the work holder when the aforesaid cross head moves upwardly, and outwardly or away from the work holder when said cross head moves downwardly, the tools performing their work during the upward movement of the cross head. A third cutter, as a circular saw, may be secured to shaft 151 at a proper point between the disks 150 and $150^a$ for the purpose of cutting a stave in two, whereby said staves may be used in the construction of buckets, tubs, and other like open-top vessels.

*The jointing mechanism.*—Referring more especially to Figs. 7, 9 and 10, it will be seen that this mechanism consists of two saws, 120 and $120^a$ mounted on independent arbors 122, that have their bearings 123 secured to angle brackets 124 and $124^a$ pivoted upon a vertical rod 141. The arbors 122 lie at a normal angle relatively to each other corresponding with the bevel of the vertical edges of the stave, and each carries a sheave or grooved pulley 121. The carrier for the jointing saws 120 and $120^a$ is composed of an upper cross bar 140 and a lower cross bar $140^a$. The upper cross bar has a slotted box bearing $b$ through the slot of which passes a connecting rod 141 that is secured in position by means of a plate $b'$ which straddles the slot in the box and through which said rod passes, and by means of suitable nuts $b^2$. From the lower cross bar $140^a$ depends a slotted or forked foot piece $140^b$ that receives the lower end of the connecting rod 141, said end of the rod being also secured by means of suitable washers and nuts, the rod being thus adjustably connected with its bearings and adapted to be moved toward or from central shaft H according to the thickness of the staves to be made. The upper and lower cross heads or bars 140 and $140^a$ are connected by angle bars or braces $111^b$ that engage guide rails $112^b$ secured to the vertical curved braces I' of the main frame, and hereinbefore referred to, the said carriage being adapted to move up and down on the aforesaid rails. The angle bars $111^b$ are adjustably and detachably connected with the cross heads of the carriage by means of set screws, so as to be readily adjusted to the curvature of the bars I' or removed. To the bearing box $b$ on the upper cross head 140 of the carriage is bolted a standard in which the journal of a sheave or grooved pulley 142 has its bearing, and there is also provided a bearing, $115^d$, on said upper cross head, to which is articulated one end of an extensible hanger rod $115^a$, the other end of which is articulated to a bearing $113^a$, adjustable on the arm $w^2$ of the balance lever W, Fig. 7, these devices being of the same construction and arrangement as the corresponding devices for the stave cutter carriage.

The mechanisms for imparting an oscillating movement to the balance lever have already been described, and I may here remark that the jointing saws perform their work on the up stroke of the arm $w^2$ of lever W, and at a time when said lever moves comparatively slowly, while the stave cutter 100 performs its work on the down stroke of arm $w'$ of lever W, and consequently also at a time when said arm moves slowly. The movement of said arms $w'$ $w^2$ in a reverse direction, *i. e.*, when they move the stave cutter upwardly and the jointing saws downwardly, at which time these tools perform no work, is much faster, owing to the configuration of the slot X in slide block Y, Fig. 7.

The brackets 124 and $124^a$ are angle brackets and are provided with sleeve bearings or hinge knuckles 125, $125^a$ through which the connecting and carrier rod 141 passes, and said brackets are supported and held in proper position by means of sleeves $125^b$ adjustably secured to rod 141 by means of set screws. See Fig. 10. From the vertical member of each of the angle brackets 124 and $124^a$ projects a Z-shaped arm A, the upper horizontal members 129 and $129^a$ of which are forked and straddle guide rods 130 and $130^a$ respectively, said guide rods having such an undulatory form as to rock the arms A and therethrough the brackets, thereby varying the angular relation of the saws 120, $120^a$ according to the varying width of the stave to be jointed,— that is to say, the saws will have the greatest convergence when the carrier commences and completes its upward motion, said convergence decreasing during the first half of said upward motion and again increasing during the second half of such motion. The rods 130, $130^a$ perform therefore the function of templets, and said rods terminate at both ends in interiorly threaded sleeves 131, through which pass screw rods 132, $132^a$ having a left and right hand thread corresponding with the thread in said sleeves. The screw rods 132 and $132^a$ have their respective bearings in four brackets 133 and $133^a$ secured to the vertical braces I' of the main frame, and each rod carries a bevel pinion 134 gearing with a like pinion 135 on a vertical spindle 138 that has its bearings in arms of two of the aforesaid brackets 133 and $133^a$ respectively, and carries a hand wheel. It is obvious that when spindle 138 is revolved in one or the other direction to cause the templet rods 130 to move toward or from each other, the brackets, and consequently the jointing saws will receive a corresponding motion, thereby lessening or increasing the degree of convergence of the jointing saws 120, $120^a$ in accordance with the bevel it is desired to give to the vertical sides of the barrel staves.

The rods 130, $130^a$ are preferably so connected with their sleeves 131 as to admit of being turned therein, whereby the relation of the undulations to the forked arms 129 and 129ᵃ are varied, thereby varying the amplitude of the oscillations of the brackets 124, 124ᵃ within certain limits.

In view of the fact that the carrier rod 141 is adjustable in the carrier frame toward and from the work or toward and from the axis of the machine, and in view of the adjustability of the saws, barrel staves whose dimensions may vary within a considerable range can be jointed by means of the described mechanism. The Z-shaped arms A may be constructed of a single piece. I prefer, however, to construct them of separate members, namely: the lower horizontal members 126, the vertical members 127, and the upper forked horizontal members 129, 129ᵃ, respectively, and secure them together adjustably by means of set screws 128, Fig. 10, whereby the length of the several members of said Z-shaped arms may be varied and therethrough the amplitude of oscillation of the brackets 124 and 124ᵃ.

To bracket 124 is secured an arm 144 that carries a sheave or grooved pulley 143, and from bracket 148 project two horizontal rods 147 and 149 secured to brackets or arms respectively depending and rising from the horizontal member or table of said bracket 124ᵃ. On the aforesaid rods are mounted coiled springs s, that have bearing upon sleeves 146 loose on said rods, said sleeves being connected by a spindle that carries a sheave or grooved pulley 145, the driving cord running from any suitable motor pulley about sheave 143, thence about sheave on arbor of saw 120 to sheave 142, sheave on arbor of saw 120ᵃ and to sheave 145, back to the motor pulley as shown in Figs. 9 and 10.

By means of the described arrangement of guide sheave 145 the variation in the strain of the driving cord during the up and down movements of the saw carriage is equalized.

The saws 120 and 120ᵃ are preferably provided with a number of planer teeth or bits, substantially as described in reference to the barrel saw 100, for the purposes set forth.

*The work holder, the carriage therefor and their actuating mechanism.*—It being understood, as hereinbefore alluded to, that the staves are cut from a block of wood of suitable form and dimension; the block is first presented to the barrel-shaped saw 100 and a slab cut away, giving the face of the block the form of the inner surface of the stave, after which said block is presented to the crozing, chamfering and gaging tools, whereby the required crozes are formed for the barrel heads, the length of the stave gaged by cutting away a portion of the upper and lower edges of the block equal to the thickness of a stave, and whereby the inner upper and lower edges of the block are suitably chamfered or beveled. After this operation the block is presented to the jointing saws, whereby the vertical edges of the block are beveled to an extent equal to the thickness of a stave, when finally the block is again presented to the stave cutter and a completed stave cut therefrom, leaving the face of the block in a condition ready to undergo the operations just described. It being further understood that the carriage for the work holders is adapted to receive six such supports, and that in practice, preferably but three of them are in use at a time, while the other three are supplied with fresh blocks of wood, so that at every complete revolution of the carriage for the work holders, after the machine is properly started, three completed staves are turned out.

I will first describe the holders for the work or blocks of wood, all of which are of similar construction, and afterward the carrier or carriage for said holders and the mechanisms for imparting to the carrier the required movements and for advancing the holders for the blocks of wood toward the tools as the finished staves are cut away, reference being had to Figs. 1, 3, 4, 5 and 6.

The support comprises top and bottom flat bars 53 and 53ᵃ, each provided with two or more projecting lugs 54 that fit and are guided in radial slots 50 in the carrier heads, said bars being connected by rods 51 and 52, that project through the bars, the opposite ends of the rods being stepped in bearings respectively formed on the lower and upper faces of toothed feed bars 60 and 60ᵃ, said connecting rods being secured in their bearings by means of set screws 60ᵇ. To the outer end of the upper frame bar 53 is pivoted a support 58 that is U-shaped in section, Fig. 6, the lower end of the sides thereof being provided with rearwardly projecting arms bent at right angles at their rear end and adjustably secured to the sides of the lower frame bar 53ᵃ by means of set screws 59. The outer vertical face of the support 58 is provided with teeth that serve to hold the block of wood placed thereon, and upon the connecting rod 52 are pivoted clamping jaws 55 that serve to clamp the sides of such block of wood, said jaws being arranged in pairs and connected by springs 56 for obvious purposes. In order that the jaws may be readily spread apart and held in that position for the introduction of a fresh block of wood I provide a spreader frame comprising a spindle 57ᵃ revoluble in the upper and lower frame bars 53 and 53ᵃ, said spindle having secured thereto oblong heads 57ᵇ connected by spreader rods 57, said spreader frame being arranged close to the inner vertical rod 52 on which the clamping jaws are pivoted, the pivot end of the jaws being sufficiently close together to be engaged by the spreader rods 57, as shown in Fig. 6; and it is obvious that if the spreader frame is turned one hundred and eighty degrees from the normal position Fig. 6, the spreader rods 57 will impinge upon the jaws 55 and spread them against the stress of their springs 56, holding such jaws in their spread position until the frame is turned back to its said normal position. Any suitable means may be provided for revolving the spreader frame, as for instance a pin or lever projecting from a sleeve 57ª on the spindle 57ª. By pivotally connecting the vertical support 58 with its frame said support can readily be adjusted to the abutting face of a block of wood so as to hold the same in proper position to be operated upon by the working tools.

The carrier for the work holders just described consists of two circular heads 20 and 21, loosely mounted on the central arbor or shaft H of the machine. They are rigidly connected by means of rods 22 and are provided in their proximate faces with six radial slots 50 for the reception of the lugs or legs 54 on the frame bars 53, 53ª of the afore-described work-holders. A pair of spring clamping jaws 70 is secured to heads 20 and 21 one on each side of and in such relation to the radial slots 50 that the jaws will project sufficiently beyond the periphery of said heads as to adapt them to engage the upper and lower faces of the block of wood on the holders, whereby said block is more securely held against vertical displacement. These clamping jaws may be constructed in one piece, the spring shanks 71 being connected at the inner end and secured by means of bolts or screws to their respective carrier heads 20 and 21, or separate jaws may be employed whose spring shanks are secured to their irrespective carrier heads on opposite sides of the radial slots 50 therein, as will be readily understood. Each of said jaws has a vertical arm 72ª that has an inwardly projecting lug 72 and an outwardly projecting lug 74, for purposes presently explained.

The hub 20ª of the upper carrier head 20 is of sufficient length to serve as a bearing for a cylindrical cap or socket piece 30 in the periphery of which are formed two spiral or helical grooves 29, while the hub 21ª of the lower carrier head 21 has bearing on the hub of a feed disk 62ª keyed to central arbor H, a similar feed disk 62 being arranged within the upper carrier head 20. This feed disk 62 has a hub 64 keyed to central shaft or arbor H above the socket piece 30, said hub being connected with the disk by arms 63, and from what has been said it will be understood that said feed disks 62 and 62ª are stationary, and both are of the same construction and perform the same function. They are provided with an annular prismatic or knife edge rib 61, in which are formed gaps 66, Fig. 5, said ribs fitting the dental spaces of the feed bars 60 and 60ª of the work holders, Fig. 3, and said gaps when brought into alignment with the radial slots permit of the withdrawal of the work holders from the carrier.

At a given point of the circular rib is secured a prismatic or knife-edged piece or dog 65 that is adjustable by means of set screws so that it can be set closer to or farther from said rib and engage the feed bars either one or more teeth outside or in front of the rib 61 to feed the work holder a distance greater than that between two teeth on the feed bars 60 and 60ª. After each complete revolution of the carrier 20 and 21, and at a time when the stave cutter has severed the completed stave from a block of wood, and the carrier commences to move to carry the work holder to the crozing mechanism, said feed dogs 65 engage the teeth of the bars 60 and 60ª and move the same outwardly a distance equal to the thickness of the stave to be cut. In other words, the feed dog 65 is arranged on the rib 61 close to where the stave cutter 100 is arranged, and on the off side thereof, so that as soon as the carrier 20 and 21 commences to revolve and thereby move the holder in front of said cutter away from the latter, the said holder is moved outwardly in its radial slots, as described. In order that the work holders may be more effectually steadied during the operation of the tools, the annular ribs 61 on the feed disks 62 and 62ª, are made of increased thickness at a suitable point, as shown at 67, Fig. 5, said enlarged portions engaging the teeth of the feed bars 60 and 60ª whenever a holder is presented to one of the tools. Inasmuch as the ends of the blocks of wood are held by the spring jaws 70, it is necessary to release said jaws while the work holder is moved outwardly, i. e., during its feed motion. This is accomplished by means of a rib 73, Figs. 3 and 5, on the periphery of the feed disks, and as the carrier for the work holders revolves after a completed stave has been severed from a block, the inwardly projecting lug 72 on the vertical arm 72ª of the said spring jaws 70, rides onto and over the said rib 73, of the upper disk 62 and under the corresponding rib on the lower feed disk 62ª whereby the jaws are spread apart and lifted off the ends of the block of wood in the work holder. See also Fig. 3.

In order that the clamping jaws 70 may be lifted for the insertion of work holders supplied with fresh blocks of wood, the carrier heads 20 and 21 are provided with an internal circular gear 75 adapted to revolve independently of said heads, said circular gear being revolved by pinions 78ª, of which I have shown only one in Fig. 3, said pinions secured to a shaft 78 that also carries a gear wheel 78ᵇ revolved through the medium of a gear 81ª and an intermediate idle gear 81, said gear 81ª being keyed to a sleeve 80ª loose on the central shaft H and carrying a hand wheel 80, the gear 81 and spindle 78 being supported from a radial arm 79 loose on the aforesaid sleeve 80ª. By means of the described mechanism the circular gears 75 can be revolved to cause curvilinear or convex ribs 76 thereon to impinge upon the outwardly projecting lugs 74 on the vertical arms 72ª of the clamping jaws 70, thereby lifting said jaws and holding them in that position until the work holder is inserted into the carrier, each of the circular gears 75 having three such ribs, as shown in Fig. 4.

In the upper head F of the main frame is formed a guide bearing for the upper end of a vertically movable spring actuated locking rod 45, the lower end of which is adapted to engage recesses or sockets in the upper face of the revoluble carrier head 20, said rod carrying a sleeve 46 provided with a projection 46ª in engagement with a lifting latch or lever 47 pivoted to one of the hub arms 63 of the upper feed ring or disk 62 which latter is provided with a guide bearing for the aforesaid locking rod 45. See Fig. 3. The inner end of the lever 47 is connected with one end of a coiled spring 49, on the rod 45, to which the other end of such spring is secured, whereby said latch is returned to a normal position when moved out of it, as hereinafter described. Between the sleeve 46 and the upper frame head F the rod 45 carries a coiled spring 48, the stress of which is upon said sleeve, and therefore tends to hold the rod in engagement with the carrier head 20. The movements of the rod are so timed as to engage a recess in the carrier head 20 whenever a work holder is in front of one of the tools, thereby preventing an accidental displacement of the work holder carrier during the operation of said tools.

The step by step movements are imparted to the carrier through the medium of the following instrumentalities: It has heretofore been stated that in making staves it is preferred to use but three work holders at a time, and inasmuch as the carrier for the holders is periodically moved an equal distance, namely: one hundred and twenty degress, the work holders must be applied to the carrier accordingly, so that there will be a work holder in every alternate slot 50 in the carrier heads 20 and 21. It has also been stated that the hub 20ª of the upper carrier head serves as a bearing for a sleeve or socket piece 30 having spiral peripheral grooves 29. The upper feed disk 62 is suspended from the upper head F of the main frame by means of hanger rods 27, Figs. 1 and 3, two of which, located diametrically opposite each other, serve as guide rods for angular actuating arms 25, the longer upwardly extending members 26 of which are of tubular form and slide freely on said rods, while the shorter downwardly projecting members are provided with laterally projecting journals carrying anti-friction rollers 28 that project into the peripheral spiral grooves 29 in the socket piece 30.

The horizontal members of the actuating arms 35 are secured to rods 24 connected with a cross head 24ª in which slides a block 23 connected with the wrist pin of a crank disk R on a shaft P that carries a worm wheel $p$ in gear with a worm $o'$ (Fig. 1) on shaft O, hereinbefore described. Through the medium of the mechanism just described a vertical reciprocating motion is imparted to the actuating arms 25, and as said arms engage spiral helical grooves in the socket piece 30, an oscillating motion is imparted to the latter.

This oscillating motion of the socket piece 30 is converted into a step by step rotary motion of the work holder carrier through the medium of the following devices.

To the feed disk 62 is secured a standard 43 to which is pivoted an actuating pawl 40, the actuating arm 38 of which is held normally projecting into the path of a locking bolt 31 that has sliding motion in a suitable recess 34 in the socket piece 30. The locking bolt is adapted to engage bolt holes 32 formed in a vertical circular flange or rim 33 on the upper carrier head 20, said bolt being guided in suitable guides 35 on the socket piece and is provided with a notch or recess in front of a lug 36 that projects some distance above the upper edge of such bolt. To a suitable bracket on the stationary feed disk 62 is secured a more or less elastic arm 37, the free end of which projects into the path of the lug or projection 36 on the bolt 31, so that when the socket piece 30 oscillates in the direction of the full arrow, Fig. 4, the said spring arm 37 engages the bolt 31 and throws the same outwardly into one of the holes 32 of the circular flange 33 of the upper carrier head 20 to lock the latter to said socket piece and revolve the carrier a predetermined distance (one hundred and twenty degrees) when said socket piece is oscillated in the direction of the dotted arrow, Fig. 4, which movement is effected by the downward stroke of the cross head 24ª and rollers 28 in helical slots 29 of the socket piece 30.

As the angle arms 25 reach the limit of their downward movement, a pin 41 on one of said arms (the left hand arm Fig. 3) impinges upon the arm 39 of the lever 40, tilting the same and thereby disengaging the bolt 31 from rim or flange 33 of the upper carrier head 20 which remains stationary, at which time a tool holder lies in front of each of the several working tools. On the upward stroke of the cross head 24ª the socket piece 30 and its bolt 31 are oscillated back again in the direction of the full arrow Fig. 4, whereby the said bolt is brought into engagement with the next hole 32 in the flange 33 on the upper carrier head 20 by the spring arm 37 ready to revolve the carrier again. The carrier for the work holders receives therefore a step by step rotation which is so timed relatively to the working tools that the said carrier receives rotary motion immediately after the said tools have performed their work, or when the stave cutter commences its upward movement, the jointing tools their downward movement, and the crozing, chamfering and gaging tools their outward movement. As the cross head 24ª moves downward, the right hand angle arm 25 strikes the lifting lever 47, and as the latter has bearing on the nose of sleeve 46 on locking rod 45, the latter is lifted out of engagement with the recess in the upper carrier head 20, thereby releasing said head so as to permit of the step by step rotation thereof, the lever 47 being released as soon as the carrier commences to revolve, thereby permitting the spring 48 to move the rod downward again and engage the next recess in the carrier head 20, which will take place when said head has reached the limit of its partial rotation, the spring 49 on rod 45 moving the lifting lever back to its normal position ready to be engaged by the arm 25 on its next downward movement. By means of these devices the carrier for the work holders is held against displacement during the operation of the tools.

In order that the work holder carrier may be continuously revolved I provide a bell-crank lever 44, the short arm of which is adapted to engage the resilient arm 37 and force the same out of the path of the projection 36 on the locking bolt 31, said lever 44 being secured in position on a toothed rack, or in any other desired manner, as shown in Fig. 4.

It is obvious that the several tools described may be used independently of one another and need not necessarily be combined in one machine, and that the mechanisms may be variously modified without departing from the nature of my invention.

From the above description, the operation of the machine will be readily understood.

Having thus described my invention, what I claim as new therein, and desire to secure by Letters Patent, is—

1. In a machine for making barrel staves, the combination with a plurality of work holders adapted to receive and hold a block of wood, of a stave cutter shaped to conform to the face of a stave, crozing, chamfering and gaging tools, stave jointing tools, mechanism for moving the work holders successively to the aforesaid tools whereby the outer face of a block of wood is first shaped to the configuration of the inner face of a barrel stave, said face crozed, its ends chamfered and cut to length, the vertical edges of the block suitably beveled, and a complete stave severed from a block leaving the face thereof ready to be operated upon by the aforesaid tools, and mechanism for imparting motion to said tools.

2. In a machine for making barrel staves, the combination with a plurality of work holders adapted to receive and hold a block of wood, of a stave cutter shaped to conform to the face of a stave, crozing, chamfering and gaging tools, stave jointing tools, mechanism for moving the work holders successively to the aforesaid tools whereby the outer face of a block of wood is first shaped to the configuration of the inner face of a barrel stave, said face crozed, its ends chamfered, and cut to length, the vertical edges of the block suitably beveled, and a complete stave severed from a block, leaving the face thereof ready to be operated upon by the aforesaid tools, mechanism for imparting motion to the tools, and feeding devices adapted to feed the work holders toward such tools a distance equal to the thickness of a stave whenever a stave has been severed from a block of wood.

3. In a machine for making barrel staves, the combination with a plurality of work holders adapted to receive and hold a block of wood, of a stave cutter shaped to conform to the face of a stave, crozing, chamfering and gaging tools, stave jointing tools, mechanism for moving the work holders successively to the aforesaid tools, whereby the outer face of a block of wood is first shaped to the configuration of the inner face of a barrel stave, said face crozed, its ends chamfered, and cut to length, the vertical edges of the block suitably beveled, and a complete stave severed from a block leaving the face thereof ready to be operated upon by the aforesaid tools, mechanism for imparting motion to the tools, feeding devices adapted to feed the work holders toward the same a distance equal to the thickness of a stave whenever a stave has been severed from a block of wood, and adjusting devices for adjusting the tools in accordance with the thickness of the staves to be made.

4. In a machine for making barrel staves, the combination with a plurality of work holders adapted to receive and support a block of wood, of a revoluble cylindrical or barrel-shaped saw, revoluble disks carrying crozing, chamfering and gaging tools, revoluble stave jointing saws adjusting mechanism adapted to automatically adjust the saws to the varying width of a stave, and mechanism for translating the work holders successively to the said tools in the order named, whereby the outer face of a block of wood is first shaped to the configuration of the inner face of a barrel stave, said face then crozed, the upper and lower edges of the block trimmed to the desired length of the stave and the inner upper and lower edges chamfered, the vertical edges of the block being next jointed and the completed stave finally severed from the block by the stave cutter leaving said block ready for the operation of the tools.

5. In a machine for making barrel staves, the combination with a plurality of work holders adapted to receive and support a block of wood, of a revoluble cylindrical or barrel-shaped saw, revoluble disks carrying crozing, chamfering, and gaging tools, revoluble stave jointing saws adjusting mechanism adapted to automatically adjust the saws to the varying width of a stave, mechanism for translating the work holders successively to the said tools in the order named, whereby the outer face of a block of wood is first shaped to the configuration of the inner face of a barrel stave, said face then crozed, the upper and lower edges of the block trimmed to the desired length of the stave and the inner upper and lower edges chamfered, the vertical edges of the block being next jointed and the completed stave finally severed from the block by the stave cutter leaving said block ready for the operation of the tools, and mechanism for feeding the holders toward the tools a distance equal to the thickness of the stave to be made.

6. In a machine for making barrel staves, the combination with a plurality of work holders adapted to receive and support a block of wood, of a revoluble cylindrical or barrel-shaped saw, revoluble disks carrying crozing, chamfering, and gaging tools, revoluble stave jointing saws adjusting mechanism adapted to automatically adjust the saws to the varying width of a stave, mechanism for translating the work holders successively to the said tools in the order named, whereby the outer face of a block of wood is first shaped to the configuration of the inner face of a barrel stave, said face then crozed, the upper and lower edges of the block trimmed to the desired length of the stave and the inner upper and lower edges chamfered, the vertical edges of the block being next jointed and the completed stave finally severed from the block by the stave cutter leaving said block ready for the operation of the tools, mechanism for feeding the holders toward the tools a distance equal to the thickness of the stave to be made, and adjusting devices for adjusting the tools in accordance with the thickness of such stave.

7. In a machine for making barrel staves, the combination with a plurality of work holders adapted to receive and support a block of wood, of a hollow or barrel shaped revoluble saw, revoluble disks carrying crozing, chamfering and gaging tools, revoluble jointing saws adjusting mechanism adapted to automatically adjust the saws to the width of the stave to be made, mechanism for translating the work holders successively to said tools, mechanism for imparting a vertical reciprocation to the hollow saw and the jointing saws, mechanism moving the crozing, chamfering and gaging tools toward and from the work holders, and a feed mechanism for feeding a work holder toward the tools whenever a completed stave is severed from the block held in such holder, for the purpose set forth.

8. In a machine for making barrel staves, the combination with a plurality of work holders, of a revoluble hollow or barrel saw, revoluble crozing, chamfering and gaging tools, a rock lever from which said devices are suspended, and mechanism for translating the work holders successively to said tools for the purpose set forth.

9. In a machine for making barrel staves, a revoluble hollow or barrel-shaped saw, revoluble jointing saws, a rock lever, a carrier for the saw suspended from one end of said rock lever, and a carrier for the jointing saws suspended from the other end of the lever, for the purpose set forth.

10. In a machine for making barrel staves, a revoluble hollow or barrel-shaped saw, revoluble jointing saws, a rock lever, a carrier for the saw suspended from one end of said rock lever, and a carrier for the jointing saws suspended from the other end of the lever, and mechanism adapted to move the aforesaid lever faster in one direction than in another, for the purpose set forth.

11. The combination with a work holder, of jointing devices comprising two revoluble saws set at an angle to each other and having a traversing motion along the work holder, of mechanism operating automatically for varying the angular relation of the saws during their traversing motion in accordance with the variation in the width of the stave.

12. In a machine for making barrel staves, a vertical curvilinear guide track, a barrel-shaped revoluble saw, a carrier adapted to reciprocate on said track, and means for adjusting the saw on the carrier in a plane at right angles to the motion of said carrier, for the purposes set forth.

13. In a machine for making barrel staves, the barrel-shaped saw 100, the bow or yoke 105 in which the saw arbor has bearing, said yoke having forked ends, in combination with a carrier 111$^a$ provided with slotted bearing boxes for the forked ends of the yoke, and set screws or bolts 107 extending through said slots and the arms of said forked ends of the yoke, for the purpose set forth.

14. In a machine for making barrel staves, the barrel-shaped saw 100, the bow or yoke 105 in which the saw arbor has bearing, said yoke having forked ends, in combination with a carrier 111$^a$ provided with slotted bearing boxes for the forked ends of the yoke, and set screws or bolts 107 extending through said slots and the arms of said forked ends of the yoke, the guides 116 for guiding and steadying the cutting edge of the saw, and the abutment arm 117 projecting into the lower end of said saw, for the purpose set forth.

15. The combination with the guide bar 154, a tool carrier, and the cross-head 155, both carrier and cross head swinging and moving to-and-fro on said bar, and the swivel block 158 on said cross head, of the rod 157 secured to the carrier and passing freely through the swivel block, and a to-and-fro movable actuating rod connected with the cross head, said rods having their axes in different planes relatively to each other and to the axis of the guide bar, for the purposes set forth.

16. In a machine for making barrel staves, the combination with the to-and-fro movable carrier for the jointing saws having the slotted box bearing $b$ and slotted foot piece 140$^b$, and a vertical shaft adjustably secured in the slots of said bearings, of brackets hinged to the shaft, jointing saw arbors revoluble in bearings in said brackets, and mechanism adapted to oscillate the brackets on their shaft during the to-and-fro motion of the carrier, for the purpose set forth.

17. In a machine for making barrel staves, the combination with the to-and-fro movable carrier for the jointing saws having the slotted box bearing $b$ and slotted foot piece 140ᵇ, and a vertical shaft adjustably secured in the slots of said bearings, of brackets hinged to the shaft, jointing saw arbors revoluble in bearings in said brackets, mechanism adapted to oscillate the brackets on their shaft during the to-and-fro motion of the carrier, and means for adjusting the amplitude of oscillation of said brackets, for the purpose set forth.

18. In a machine for making barrel staves, the combination with jointing saws, independent spindles therefor set at an angle to each other, and reciprocating and rocking carriers for said spindles, of irregular guides for guiding and rocking said carriers during their reciprocation for the purpose of varying the angular relation of the saws.

19. In a machine for making barrel staves, the combination with the to-and-fro movable carrier for the jointing saws, the saw arbor supporting brackets provided with slotted or forked guide arms, and the carrier shaft to which said brackets are hinged or pivoted, of the guide rods 130, 130ᵃ of irregular or undulating form passing through the slot or fork of the aforesaid guide arms, screw rods 132 and 132ᵃ working in threaded bearings at the ends of said guide rods, said screw rods having right and left hand screw threads, and means for revolving said rods, for the purpose set forth.

20. In a machine for making barrel staves, the combination with the bracket 124, its saw arbor and grooved pulley thereon, and the inclined arm 144 carrying the grooved pulley 143 of the bracket 124ᵃ its saw arbor and grooved pulley thereon, horizontal arms 147 and 149 carrying coiled springs, a spindle carrying a grooved pulley 145, and bearing sleeves for said spindle loosely mounted on said horizontal arms 147 in front of the coiled springs thereon, of a guide pulley 142 above said brackets, a to-and-fro movable carrier for said parts, and a driving cord running about pulley 143 and the pulley on saw arbor on bracket 124, about guide pulley 142, thence about pulley on saw arbor on bracket 124ᵃ, and about pulley 145, substantially as and for the purpose set forth.

21. In a machine for making barrel staves, a work holder comprising top and bottom flat bars, connecting rods connecting said bars, a vertical abutment or support against which a block of wood is adapted to be placed, and pairs of superposed spring clamps pivoted upon one of the rods, their clamping jaws projecting over the front face of such abutment, for the purpose set forth.

22. In a machine for making barrel staves, a work holder comprising top and bottom flat bars, connecting rods connecting said bars, a vertical abutment or support against which a block of wood is adapted to be placed, and pairs of superposed spring clamps pivoted upon one of the rods, their clamping jaws projecting over the front face of such abutment, in combination with a spreader frame journaled between the arms of the clamps and adapted to spread the same apart and hold them in that position for the purpose set forth.

23. In a machine for making barrel staves, a work holder comprising top and bottom flat bars provided on their upper and lower faces with lugs or legs, connecting rods connecting said bars, a vertical abutment or support against which a block of wood is adapted to be placed, and pairs of superposed spring clamps pivoted upon one of the connecting rods, their clamping jaws projecting over the front face of such abutment, in combination with a revoluble carrier comprising circular heads provided with radial slots extending from the periphery toward the center of such heads and adapted to receive the lugs or legs on the work supports, for the purpose set forth.

24. In a machine for making barrel staves, the combination with a suitable holder for a block of wood and toothed feed bars as 60 and 60ᵃ connected with the holder at its upper and lower end, of a revoluble carrier comprising circular heads having radial slots in which the holder is adapted to slide, concentric fixed ribs adapted to engage the teeth of the aforesaid feed bars, and a fixed feed dog in advance or outside of said circular ribs adapted to move the holder outwardly a predetermined distance at each complete revolution of the carrier, for the purpose set forth.

25. In a machine for making barrel staves, the combination with a suitable holder for a block of wood, and toothed feed bars as 60 and 60ᵃ connected with the holder at its upper and lower end, of a revoluble carrier comprising circular heads having radial slots in which the holder is adapted to slide, concentric fixed ribs adapted to engage the teeth of the aforesaid feed bars, said ribs provided with gaps 66 of a width substantially equal to that of the radial slots in the carrier, and a fixed feed dog in advance or outside of said circular ribs adapted to move the holder outwardly a predetermined distance at each complete revolution of the carrier, for the purpose set forth.

26. In a machine for making barrel staves, the combination with a suitable holder for a block of wood, a carrier on which said holder is adapted to move, spring clamping jaws connected with the carrier and adapted to engage the ends of the block of wood in the holder, feeding devices adapted to periodically move the holder on the carrier, and means for disengaging the clamping jaws from the block of wood during the feed motion of the holder, for the purpose set forth.

27. In a machine for making barrel staves, the combination with a suitable holder for a block of wood, a carrier on which said holder is adapted to move, spring clamping jaws adapted to engage the ends of the block of wood in the holder, feeding devices adapted to automatically and periodically move the holder on the carrier, and means adapted to automatically disengage the clamping jaws from the block of wood during the feed motion of the holder, for the purpose set forth.

28. In a machine for making barrel staves, a revoluble carrier comprising rigidly connected circular heads provided with radial slots in coincident planes, work holders adjustable therein and a spring clamping jaw on each side of said slots projecting beyond the periphery and the proximate faces of the heads, and means adapted to simultaneously move the jaws on both heads from their normal or operative position, for the purpose set forth.

29. In a machine for making barrel staves, a revoluble carrier comprising rigidly connected circular heads having radial slots, a holder for a block of wood interposed between said heads and adapted to move along the slots therein, a spring actuated clamping jaw on each side of said slots adapted to engage the ends of the block of wood in the holder, feeding devices adapted to automatically and periodically move the holder a predetermined distance along the carrier slots, mechanism adapted to automatically disengage the clamping jaws from the block of wood during the feed motion of the holder, and independent mechanism adapted to be operated by hand and to simultaneously move the clamping jaws in both heads from a normal or operative position, for the purpose set forth.

30. In a machine for making barrel staves, the combination with the revoluble carrier heads 20 and 21, the spring clamps 70 connected therewith and provided with a vertical arm having a horizontal lug 74, of an internally toothed ring concentric with and revoluble independently of the said circular heads, said ring provided with ribs 76 adapted to engage the lugs 74 on the clamping jaws, for the purpose set forth.

31. In a machine for making barrel staves, the combination with the revoluble carrier heads 20 and 21, the spring clamps 70 connected therewith and provided with a vertical arm having an inwardly projecting horizontal lug 72, of a fixed concentric ring provided with ribs 73 adapted to engage the aforesaid lugs, for the purpose set forth.

32. In a machine for making barrel staves, the combination with the upper cylindrical head of the work holder carrier, said head provided with bolt holes arranged in a circle, of an oscillatory device, a bolt movably connected therewith, and adapted to engage the aforesaid bolt holes, means adapted to move said bolt into one of the bolt holes when the device is oscillated in one direction, and means adapted to move the bolt from such hole when said device is oscillated in a reverse direction, whereby a continuous step by step rotation is imparted to the carrier head, for the purpose set forth.

33. In a machine for making barrel staves, the combination with the upper cylindrical head of the work holder carrier, said head provided with bolt holes arranged in a circle, of an oscillatory device, a bolt movably connected with said device and adapted to engage the aforesaid bolt holes, a stationary actuating arm adapted to move the bolt into one of the bolt holes when the device is oscillated in one direction, and means adapted to move the bolt from such hole when said device oscillates in a reverse direction, of mechanism for throwing the stationary actuating arm out of operation, whereby the work holder carrier can be continuously rotated independently of the oscillatory device, for the purpose set forth.

34. In a machine for making barrel staves, the combination with the upper cylindrical head of the work holder carrier said head provided with bolt holes arranged in a circle, of an oscillatory device, a bolt movably connected with said device and adapted to engage the aforesaid bolt holes, a stationary actuating arm adapted to move the bolt into one of the bolt holes when the device is oscillated in one direction, and means adapted to move the bolt from such hole when said device oscillates in a reverse direction, of mechanism for throwing the stationary actuating arm out of operation, whereby the work holder carrier can be continuously rotated independently of the oscillatory device, and mechanism adapted to be operated by hand and to impart such continuous rotation to the carrier head, for the purposes set forth.

35. In a machine for making barrel staves, the combination with the upper carrier head 21 provided with the concentric ring 33 having bolt holes 32, the oscillatory socket piece 30 revoluble on the hub of said head 21, a bolt 36 movable in a recess in said socket piece, and adapted to engage the bolt holes 32, of a resilient arm adapted to engage the bolt and move the same into one of the holes 32 when the socket piece is oscillated in one direction, and a lever 40 adapted to disengage the bolt from such hole when said socket piece is oscillated in a reverse direction, for the purpose set forth.

36. In a machine for making barrel staves, the combination with the feed disk 62 the socket piece 30 having peripheral spiral grooves 29, and a locking device for locking the disk to the socket of the angle arms 25 carrying anti-friction rollers 29 extending into said grooves, suitable guide rods passing through said arms, a cross-head rigidly connected thereto, a slide block in said cross head and a revoluble crank disk the wrist pin of which is connected with the slide block, for the purpose set forth.

37. In a machine for making barrel staves, the combination with the feed disk 62, the lever 40 pivoted thereto, of the socket piece 30 having peripheral spiral grooves, and a locking bolt movable in said socket piece and adapted to engage the rim of feed disk 62 and to be moved by lever 40 out of engagement with said rim, and the to-and-fro movable arms 25 extending into the aforesaid peripheral grooves, one of said arms provided with a pin adapted to engage one of the arms of lever 40, substantially as and for the purpose set forth.

38. In a machine for making barrel staves, the combination with the spring-actuated locking rod 45, and its sleeve 46, the spring-actuated lever 47, one arm of which is in normal engagement with the sleeve 46, the revoluble feed disk 62 normally locked by rod 45 and the socket piece 30 having spiral grooves 29, of the vertically to-and-fro movable angle arms 25 carrying anti-friction rollers 28 extending into said spiral grooves, one of said arms adapted during its downward motion to engage one of the arms of lever 47, lift the rod 45 against the stress of its spring and again release the same, for the purpose set forth.

39. In a machine for making barrel staves, the combination with a revoluble stave cutter, revoluble crozing, chamfering and gaging tools, revoluble jointing saws, a plurality of holders adapted to receive and hold a block of wood, a carrier for said holder, and spring clamping jaws adapted to engage the ends of the block of wood in the holders, of mechanism adapted to impart a step-by-step rotary motion to the holder carrier to move the holders successively from the stave cutter to the other tools and back to said stave cutter, a locking device adapted to lock the carrier against motion after the completion of each step in its rotary motion and release the same before making the next step, mechanisms adapted to move the revoluble stave cutter downwardly, the revoluble stave jointing saws upwardly, and swing the crozing, chamfering and gaging tools inwardly after each step by step motion of the carrier, and mechanisms adapted to move a holder toward the tools and simultaneously spread the clamping jaws apart and again release them during the movement of such holder from the stave cutter to the crozing, chamfering and gaging tools, for the purpose set forth.

40. In a machine for making barrel staves, the combination with work holders, of a revoluble saw, shaped to conform to the face of the stave, revoluble crozing, chamfering and gaging tools, and a rock lever from the opposite arms of which the said saw and tools are suspended.

In witness whereof I have hereunto set my hand in presence of two witnesses.

JOHN OLSEN STORVIK.

Witnesses:
O. STORVIK,
O. HANSEN.